United States Patent
ElBsat et al.

(10) Patent No.: US 10,884,398 B2
(45) Date of Patent: Jan. 5, 2021

(54) SYSTEMS AND METHODS FOR PREDICTION MODEL UPDATE SCHEDULING FOR BUILDING EQUIPMENT

(71) Applicant: Johnson Controls Technology Company, Auburn Hills, MI (US)

(72) Inventors: Mohammad N. ElBsat, Milwaukee, WI (US); Michael J. Wenzel, Grafton, WI (US)

(73) Assignee: Johnson Controls Technology Company, Auburn Hills, MI (US)

(*) Notice: Subject to any disclaimer, the term of this patent is extended or adjusted under 35 U.S.C. 154(b) by 14 days.

(21) Appl. No.: 16/240,466

(22) Filed: Jan. 4, 2019

(65) Prior Publication Data
US 2020/0218233 A1 Jul. 9, 2020

(51) Int. Cl.
*G05B 19/418* (2006.01)
*G05B 13/04* (2006.01)
*G06Q 50/06* (2012.01)
*G05F 1/66* (2006.01)
*G05B 15/02* (2006.01)

(52) U.S. Cl.
CPC ......... *G05B 19/418* (2013.01); *G05B 13/042* (2013.01); *G05B 13/048* (2013.01); *G05F 1/66* (2013.01); *G06Q 50/06* (2013.01); *G05B 15/02* (2013.01); *G05B 2219/31414* (2013.01); *G05B 2219/32021* (2013.01)

(58) Field of Classification Search
None
See application file for complete search history.

(56) References Cited

U.S. PATENT DOCUMENTS

| | | |
|---|---|---|
| 7,580,775 B2 | 8/2009 | Kulyk et al. |
| 7,894,946 B2 | 2/2011 | Kulyk et al. |
| 8,527,108 B2 | 9/2013 | Kulyk et al. |
| 8,527,109 B2 | 9/2013 | Kulyk et al. |
| 8,918,223 B2 | 12/2014 | Kulyk et al. |
| 9,110,647 B2 | 8/2015 | Kulyk et al. |
| 9,429,923 B2 | 8/2016 | Ward et al. |

(Continued)

OTHER PUBLICATIONS

U.S. Appl. No. 15/953,324, filed Apr. 13, 2018, Johnson Controls Technology Company.
U.S. Appl. No. 16/115,290, filed Aug. 28, 2018, Kumar, et al.

*Primary Examiner* — Jason Lin
(74) *Attorney, Agent, or Firm* — Foley & Lardner LLP

(57) ABSTRACT

A building system includes building equipment operable to consume one or more resources and a control system configured to generate, based on a prediction model, predictions of a load on the building equipment or a price of the one or more resources for a plurality of time steps in an optimization period, solve, based on the predictions, an optimization problem to generate control inputs for the equipment that minimize a predicted cost of consuming the resources over the optimization period, control the building equipment to operate in accordance with the control inputs, monitor an error metric that characterizes an error between the predictions and actual values of the at least one of the load on the building equipment or the price of the one or more resources during the optimization period, detect an occurrence of a trigger condition, and in response to detecting the trigger condition, update the prediction model.

20 Claims, 8 Drawing Sheets

(56) References Cited

U.S. PATENT DOCUMENTS

| | | |
|---|---|---|
| 9,703,339 B2 | 7/2017 | Kulyk et al. |
| 10,101,731 B2 | 10/2018 | Asmus et al. |
| 10,139,877 B2 | 11/2018 | Kulyk et al. |
| 2009/0063122 A1* | 3/2009 | Nasle ................ G05B 23/0235 703/18 |
| 2011/0082597 A1* | 4/2011 | Meagher .................. H02J 3/38 700/291 |
| 2015/0088576 A1* | 3/2015 | Steven ...................... G05F 1/66 705/7.22 |
| 2015/0302318 A1* | 10/2015 | Chen ....................... G06F 17/18 706/12 |
| 2015/0316907 A1 | 11/2015 | Elbsat et al. |
| 2018/0314220 A1 | 11/2018 | Kumar et al. |
| 2019/0079473 A1 | 3/2019 | Kumar et al. |
| 2019/0316802 A1 | 10/2019 | Alanqar et al. |

* cited by examiner

SYSTEMS AND METHODS FOR PREDICTION MODEL UPDATE SCHEDULING FOR BUILDING EQUIPMENT

BACKGROUND

The present disclosure relates generally to the field of building equipment, and in particular to various types of building equipment that may be controlled using prediction models. Building equipment may include, among other possibilities, HVAC systems, airside systems, waterside systems, variable refrigerant flow (VRF) systems, central plant equipment, and/or other equipment operable to affect a variable state or condition of a building (e.g., temperature, humidity, airflow, lighting, etc.).

Operators of building equipment may desire to control such building equipment to optimize costs, for example to minimize the cost of a utility consumed by the building equipment while maintaining occupant comfort. These optimizations may be performed over future optimization periods, for example to plan optimal control of building equipment over the upcoming week or month. Accurate prediction models used to predict system behavior over the optimization period are therefore important to successful optimization of building equipment control. Accordingly, systems and methods for ensuring the ongoing accuracy of prediction models are needed.

SUMMARY

One implementation of the present disclosure is a building system. The building system includes building equipment operable to consume one or more resources and affect a variable state or condition of a building. The resources are provided by one or more utility systems. The building system includes a control system configured to generate, based on a prediction model, predictions of at least one of a load on the building equipment or a price of the one or more resources for a plurality of time steps in an optimization period, solve, based on the predictions, an optimization problem to generate control inputs for the equipment that minimize a predicted cost of consuming the one or more resources over the optimization period, control the building equipment to operate in accordance with the control inputs, monitor an error metric that characterizes an error between the predictions and actual values of the at least one of the load on the building equipment or the price of the one or more resources during the optimization period, and detect an occurrence of a trigger condition. The trigger condition is defined as a property of the error metric. The control system is also configured to, in response to detecting the trigger condition, update the prediction model to generate an updated prediction model, generate updated control inputs for the building equipment based on the updated prediction model, and control the building equipment to operate in accordance with the updated control inputs.

In some embodiments, the control system is configured to calculate the error metric as a coefficient of variation weighted mean absolute prediction error of the predictions. In some embodiments, the control system is configured to calculate the coefficient of variation weighted mean absolute prediction error using a user-selectable weighting.

In some embodiments, the control system is configured to calculate the error metric as a smoothed current prediction error. In some embodiments, the trigger condition occurs when the error metric is outside a control region. In some embodiments, the trigger condition occurs when the error metric is outside the control region for at least a threshold duration. In some embodiments, the control system is configured to determine at least one of an upper limit of the control region or a lower limit of the control region as a statistical property of the error metric. In some embodiments, the control system is configured to updated the at least one of the upper limit of the control region or the lower limit of the control region in accordance with a change in the statistical property of the error metric over time. In some embodiments, the control system is configured to update the statistical property of the error metric in response to updating the prediction model.

Another implementation of the present disclosure is a method for controlling a building system. The method includes operating building equipment to consume one or more resources and affect a variable state or condition of a building. The resources are provided by one or more utility systems. The method also includes generating, based on a prediction model, predictions of at least one of a load on the building equipment or a price of the one or more resources for a plurality of time steps in a time period, generating, based on the predictions, control inputs for the equipment that manage a predicted cost of consuming the one or more resources over the time period, controlling the building equipment to operate in accordance with the control inputs, monitoring an error metric that characterizes an error between the predictions and actual values of the at least one of the load on the building equipment or the price of the one or more resources during the time period, and detecting an occurrence of a trigger condition. The trigger condition is defined as a property of the error metric. The method also includes, in response to detecting the trigger condition, updating the prediction model to generate an updated prediction model, generating updated control inputs for the building equipment based on the updated prediction model, and controlling the building equipment to operate in accordance with the updated control inputs.

In some embodiments, the method includes calculating the error metric as a coefficient of variation weighted mean absolute prediction error of the predictions. In some embodiments, the method includes calculating the coefficient of variation weighted mean absolute prediction error using a user-selectable weighting.

In some embodiments, the method includes calculating the error as a smoothed current prediction error. In some embodiments, the trigger condition occurs when the error is outside a control region. In some embodiments, the trigger condition occurs when the error metric is outside the control region for at least a threshold duration. In some embodiments, the method includes determining at least one of an upper limit of the control region or a lower limit of the control region as a statistical property of the error metric. In some embodiments, the method includes updating the at least one of the upper limit of the control region or the lower limit of the control region in accordance with a change in the statistical property of the error metric over time. In some embodiments, the method includes updating the statistical property of the error metric in response to updating the prediction model.

Another implementation of the present disclosure is a central plant. The central plant includes a plurality of subplants operable to consume, generate, or store one or more resources. At least one of the resources is provided by a utility system at a utility rate. The central plant also includes a control system configured to generate, based on one or more prediction models, predictions of at least one of a load on a campus served by the central plant or the utility rate for a plurality of time steps in an optimization period, solve, based on the predictions, an optimization problem to generate control inputs for the subplants that minimize a predicted cost of consuming the resource provided by the utility system over the optimization period, control the subplants to operate in accordance with the control inputs, monitor an error metric that characterizes an error between the predictions and actual values of the at least one of the load on the campus served by the central plant or the utility rate, and detect an occurrence of a trigger condition. The trigger condition defined as a property of the error metric. The control system is also configured to, in response to detecting the trigger condition, update the one or more prediction models and control the plurality of subplants in accordance with an optimization strategy generated based on the updated prediction models.

In some embodiments, the control system is configured to calculate the error metric as a coefficient of variation weighted mean absolute prediction error of the predictions using a user-selectable weighting. In some embodiments, the control system is configured to calculate the error metric as a smoothed current prediction error. In some embodiments, the control system is configured to generate a graphical user interface that includes a visualization of the error metric and the trigger condition.

DETAILED DESCRIPTION

Building Equipment

Figure 1:
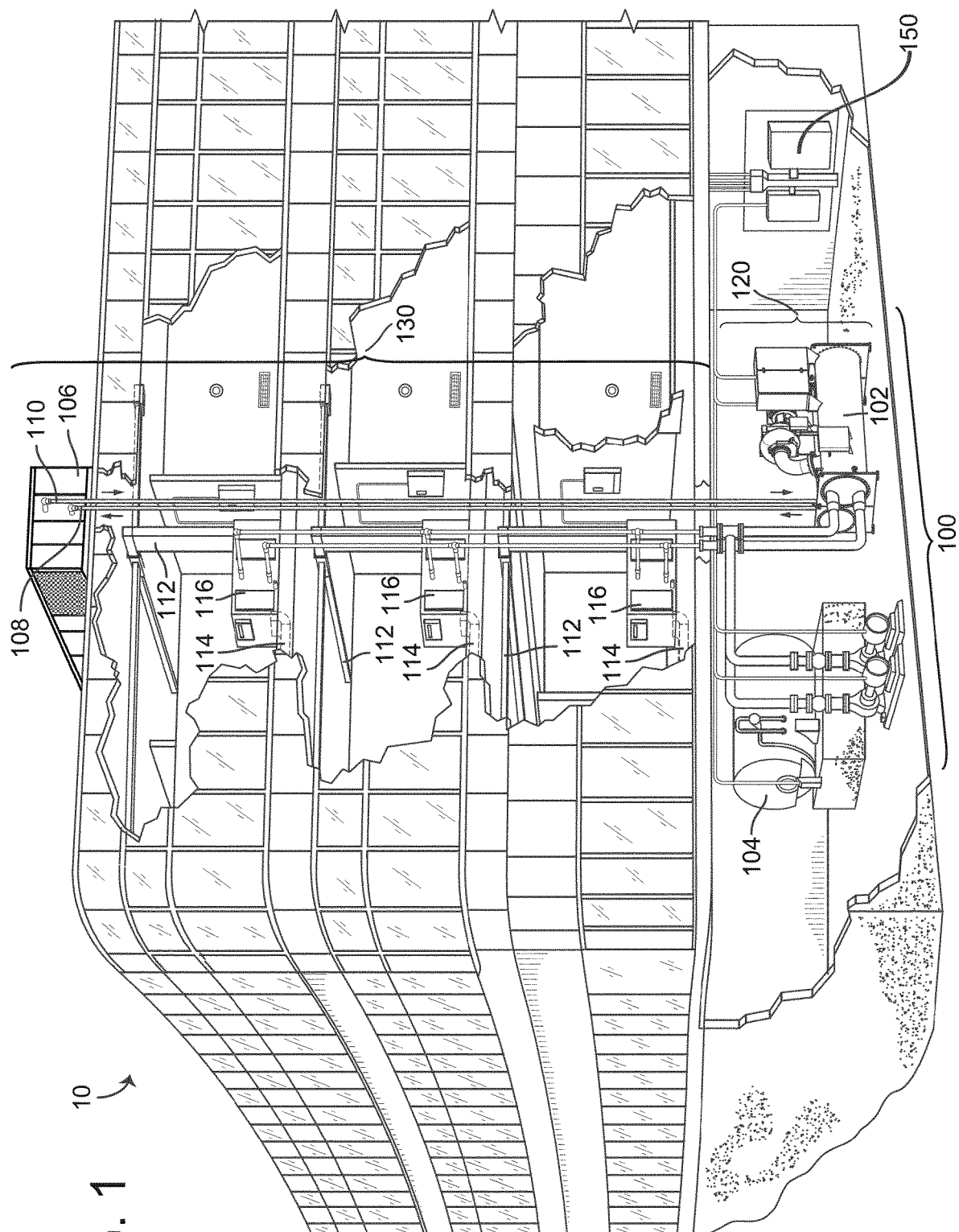
FIG. 1 is a perspective view of a building served by a building management system and an HVAC system, according to an exemplary embodiment.
Figure 2:
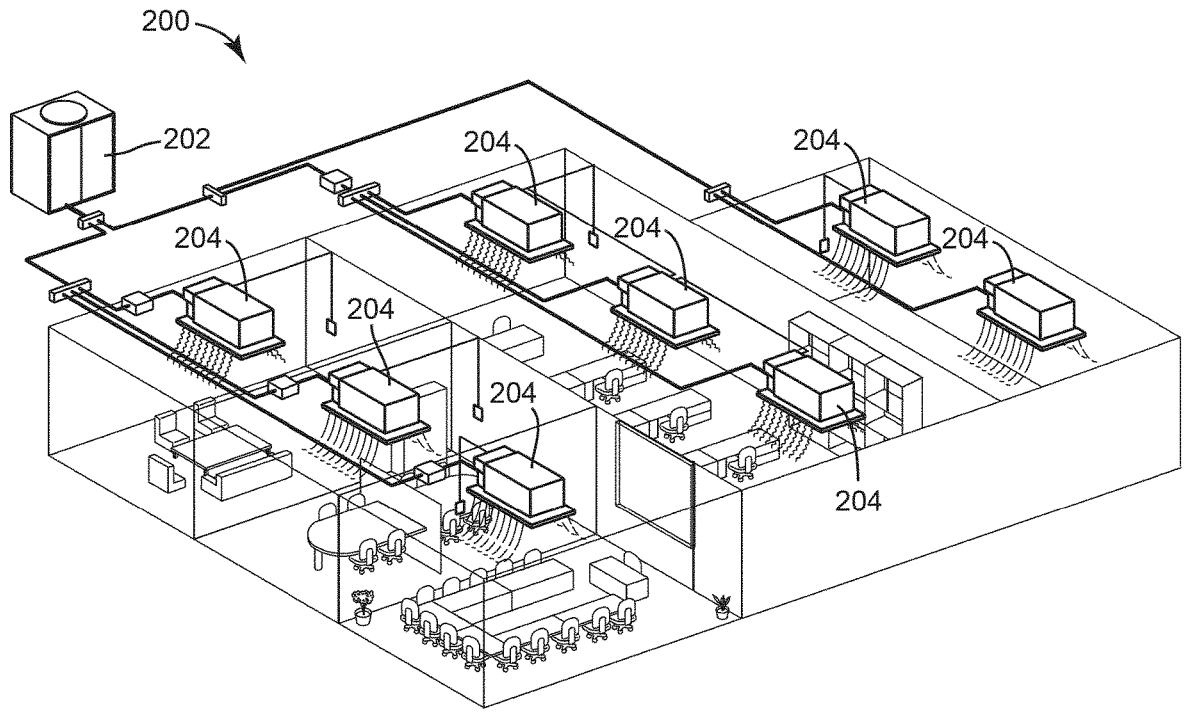
FIG. 2 is a first illustration of a variable refrigerant flow system, according to an exemplary embodiment.
Figure 3:
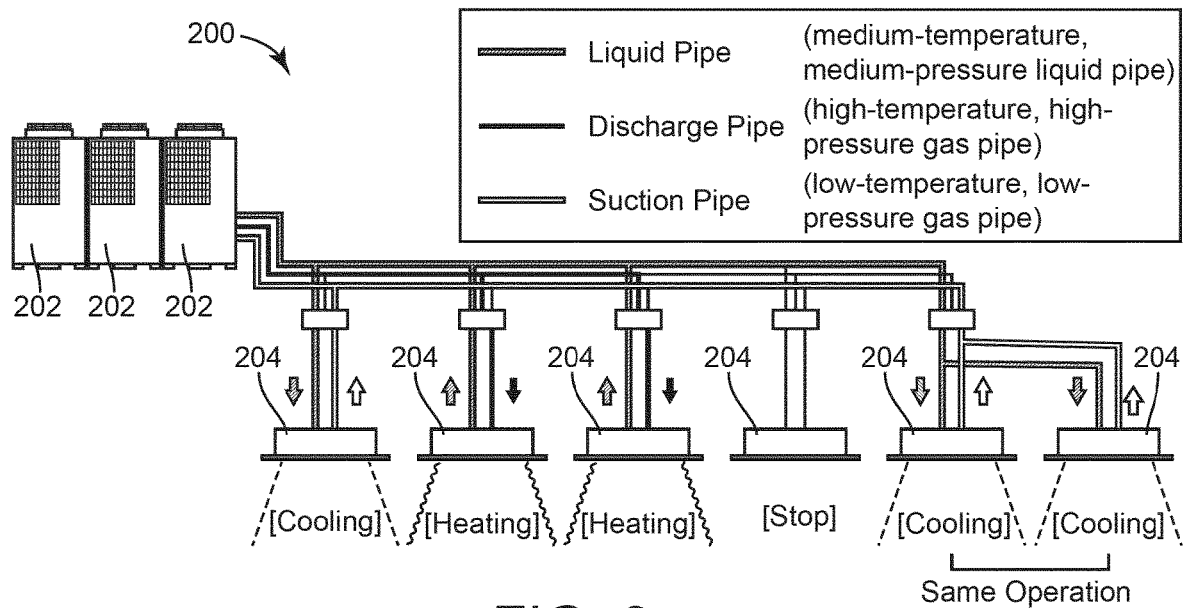
FIG. 3 is a second illustration of a variable refrigerant flow system, according to an exemplary embodiment.
Figure 4:
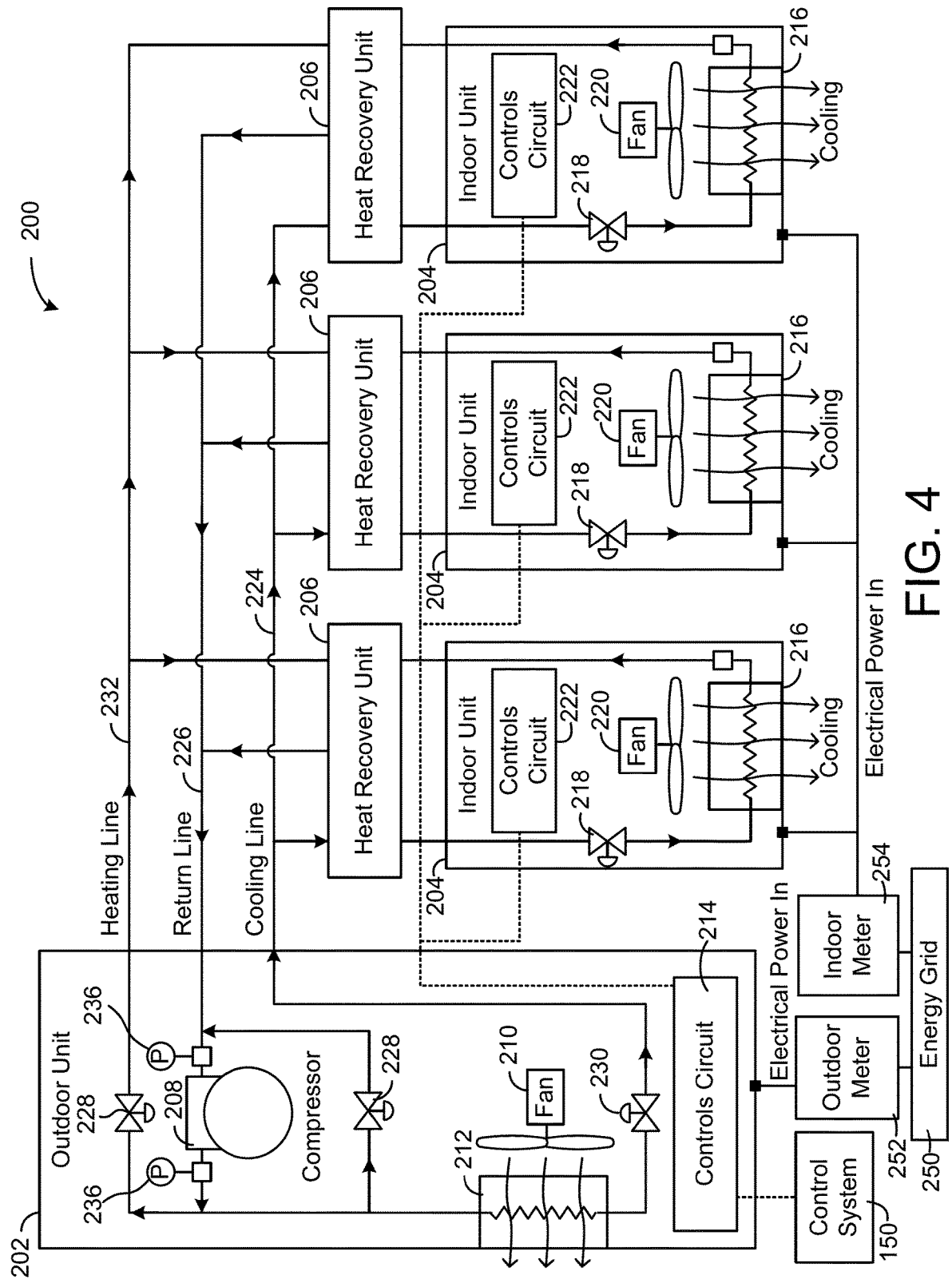
FIG. 4 is a block diagram of a variable refrigerant flow system, according to an exemplary embodiment.
Figure 5:
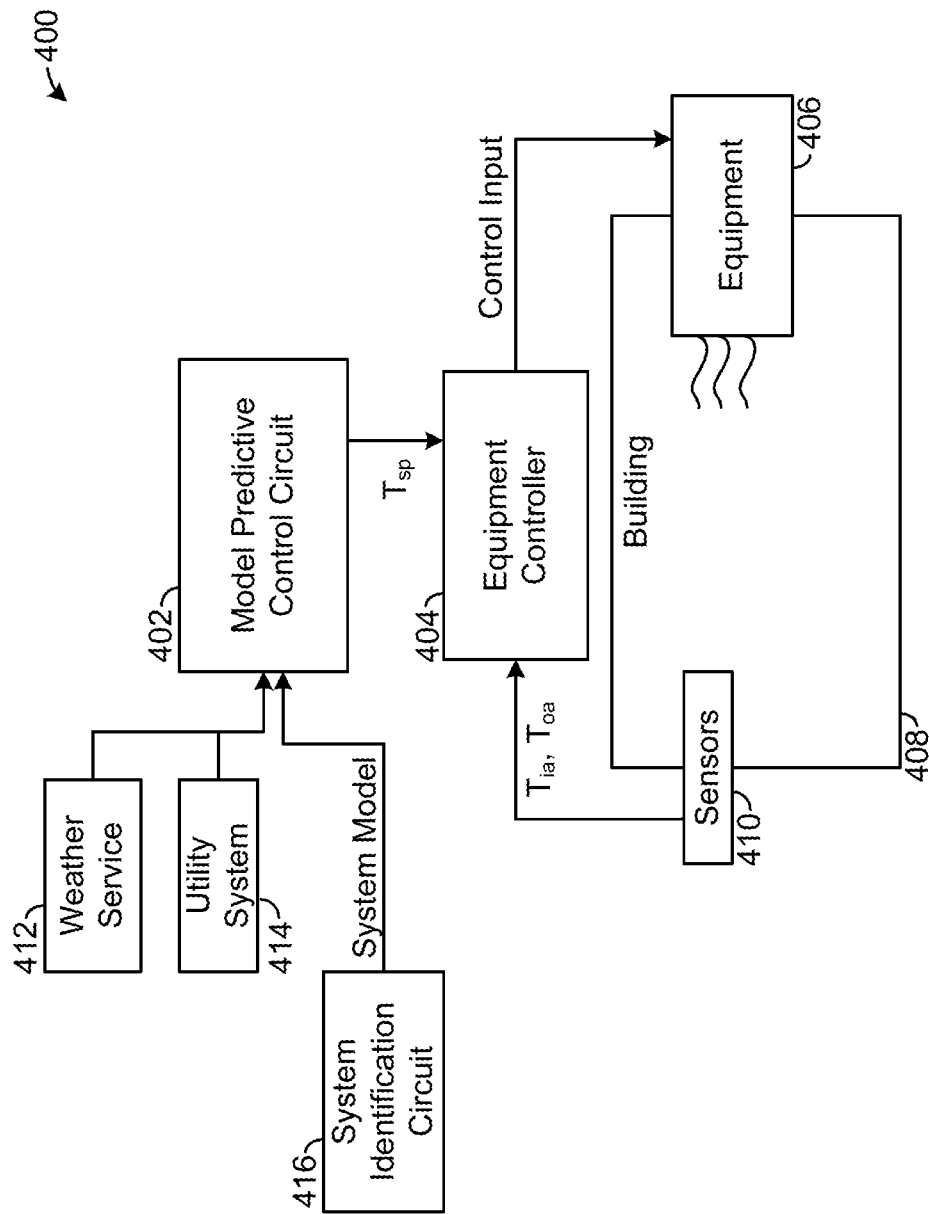
FIG. 5 is a block diagram of building system with a model predictive controller, according to an exemplary embodiment.
Figure 6:
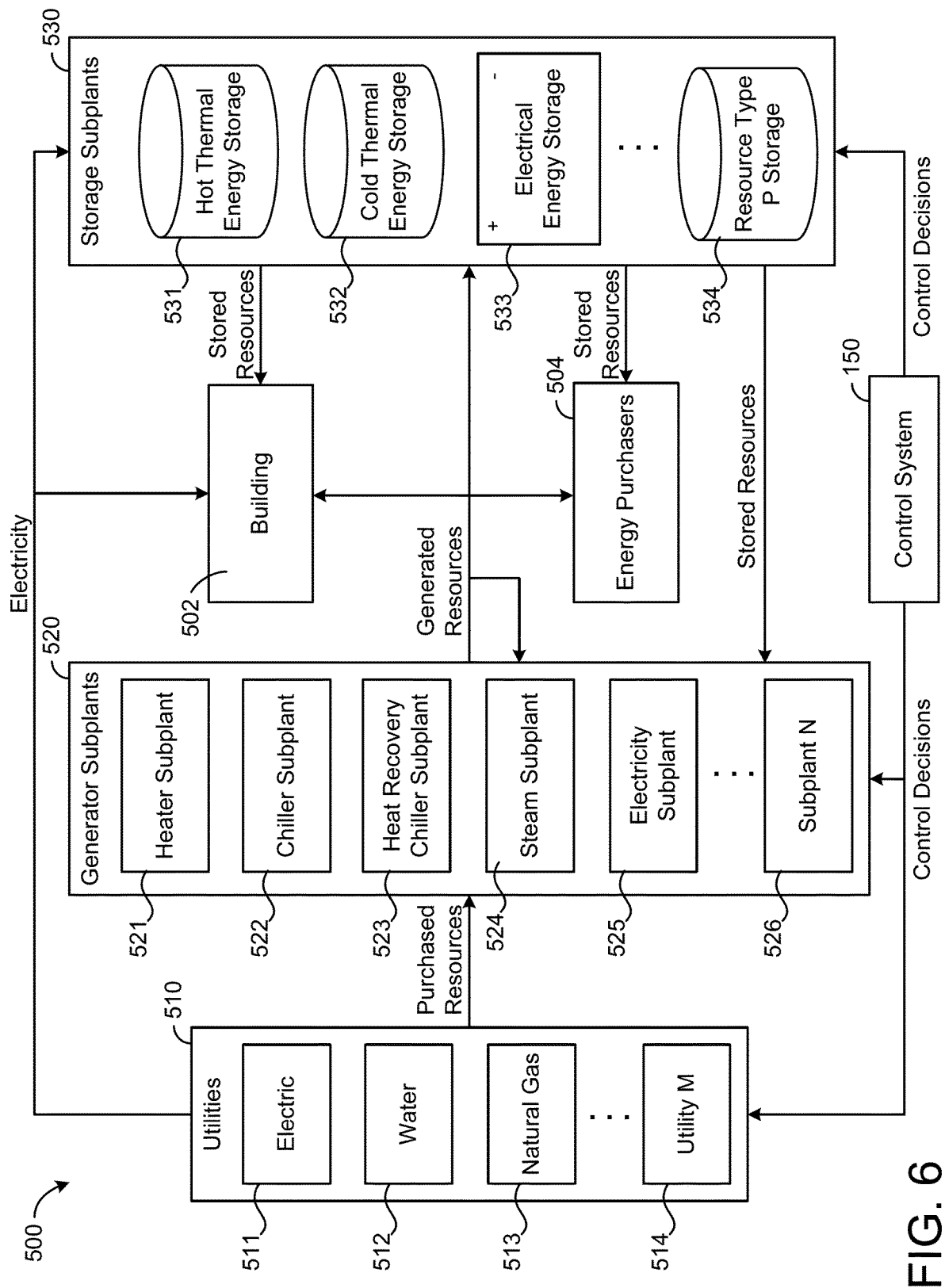
FIG. 6 is a block diagram of a central plant with an energy storage system is shown, according to an exemplary embodiment.
Figure 7:
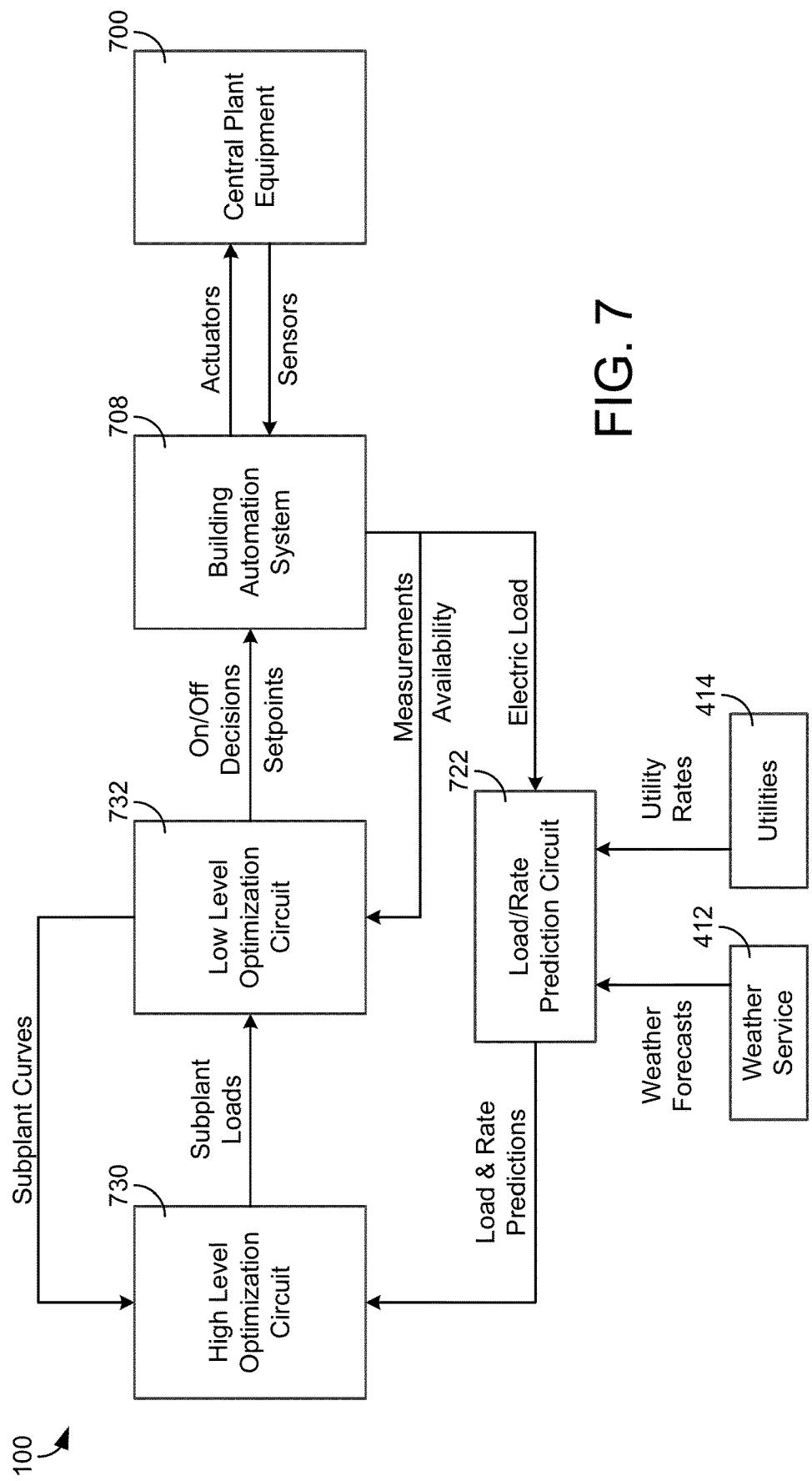
FIG. 7 is a block diagram of a control system for use with the central plant of FIG. 6, according to an exemplary embodiment.

Referring now to FIGS. 1-8, various types of building equipment are shown, according to exemplary embodiments. Building equipment refers to any equipment, device, etc. operable alone or in combination with other equipment to affect a variable state or condition of a building (e.g., temperature, airflow, humidity, light, etc.), including by generating or storing energy for use by other equipment (e.g., central plant equipment). The embodiments shown and described herein include a heating, ventilation, and cooling (HVAC) system as shown in FIG. 1, a variable refrigerant flow (VRF) system as shown in FIG. 2-4, a building system with a model predictive controller as shown in FIG. 5, and a central plant as shown in FIG. 6-7. It should be understood that variations and combinations of these systems and other building equipment are within the scope of the present disclosure.

Building HVAC Systems

Referring to FIG. 1, a perspective view of a building 10 is shown, according to an exemplary embodiment. Building 10 is served by a building management system (BMS). A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination.

The BMS that serves building 10 includes a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

HVAC system 100 thereby provides heating and cooling to the building 10. The building 10 also includes other sources of heat transfer that the indoor air temperature in the building 10. The building mass (e.g., walls, floors, furniture) influences the indoor air temperature in building 10 by storing or transferring heat (e.g., if the indoor air temperature is less than the temperature of the building mass, heat transfers from the building mass to the indoor air). People, electronic devices, other appliances, etc. ("heat load") also contribute heat to the building 10 through body heat, electrical resistance, etc. Additionally, the outside air temperature impacts the temperature in the building 10 by providing heat to or drawing heat from the building 10.

HVAC system 100 also includes a control system 150. The control system 150 receives data about the HVAC system 100 and the building 10 (e.g., indoor air temperature, outdoor air temperatures, etc.) and generates control signals to control the HVAC system 100 to heat and/or cool the building 10. The control system 150 may be configured to perform one or more optimizations to determine optimal control for the HVAC system 100 over an optimization period, for example as described with reference to FIGS. 5 and 8-9 below. Furthermore, the control system 150 may be configured to perform online scheduling of prediction model updates as described with reference to FIGS. 8-9.

Variable Refrigerant Flow System

Referring now to FIGS. 2-4, a variable refrigerant flow (VRF) system 200 serving a building 201 is shown, according to exemplary embodiments. VRF system 200 is shown to include one or more outdoor VRF units 202 and a plurality of indoor VRF units 204. Outdoor VRF units 202 can be located outside a building and can operate to heat or cool a refrigerant. Outdoor VRF units 202 can consume electricity to convert refrigerant between liquid, gas, and/or super-heated gas phases. Indoor VRF units 204 can be distributed throughout various building zones within a building and can receive the heated or cooled refrigerant from outdoor VRF units 202. Each indoor VRF unit 204 can provide temperature control for the particular building zone in which the indoor VRF unit 204 is located. Although the term "indoor" is used to denote that the indoor VRF units 204 are typically located inside of buildings, in some cases one or more indoor VRF units are located "outdoors" (i.e., outside of a building) for example to heat/cool a patio, entryway, walkway, etc.

One advantage of VRF system 200 is that some indoor VRF units 204 can operate in a cooling mode while other indoor VRF units 204 operate in a heating mode. For example, each of outdoor VRF units 202 and indoor VRF units 204 can operate in a heating mode, a cooling mode, or an off mode. Each building zone can be controlled independently and can have different temperature setpoints. In some embodiments, each building has up to three outdoor VRF units 202 located outside the building (e.g., on a rooftop) and up to 128 indoor VRF units 204 distributed throughout the building (e.g., in various building zones). Building zones may include, among other possibilities, apartment units, offices, retail spaces, and common areas. In some cases, various building zones are owned, leased, or otherwise occupied by a variety of tenants, all served by the VRF system 200.

Many different configurations exist for VRF system 200. In some embodiments, VRF system 200 is a two-pipe system in which each outdoor VRF unit 202 connects to a single refrigerant return line and a single refrigerant outlet line. In a two-pipe system, all of outdoor VRF units 202 may operate in the same mode since only one of a heated or chilled refrigerant can be provided via the single refrigerant outlet line. In other embodiments, VRF system 200 is a three-pipe system in which each outdoor VRF unit 202 connects to a refrigerant return line, a hot refrigerant outlet line, and a cold refrigerant outlet line. In a three-pipe system, both heating and cooling can be provided simultaneously via the dual refrigerant outlet lines. An example of a three-pipe VRF system 200 is described in detail with reference to FIG. 4.

In FIG. 4, the VRF system 200 is shown to include outdoor VRF unit 202, several heat recovery units 206, and several indoor VRF units 204. Outdoor VRF unit 202 may include a compressor 208, a fan 210, or other power-consuming refrigeration components configured convert a refrigerant between liquid, gas, and/or super-heated gas phases. Indoor VRF units 204 can be distributed throughout various building zones within a building and can receive the heated or cooled refrigerant from outdoor VRF unit 202. Each indoor VRF unit 204 can provide temperature control for the particular building zone in which the indoor VRF unit 204 is located. Heat recovery units 206 can control the flow of a refrigerant between outdoor VRF unit 202 and indoor VRF units 204 (e.g., by opening or closing valves) and can minimize the heating or cooling load to be served by outdoor VRF unit 202.

Outdoor VRF unit 202 is shown to include a compressor 208 and a heat exchanger 212. Compressor 208 circulates a refrigerant between heat exchanger 212 and indoor VRF units 204. The compressor 208 operates at a variable frequency as controlled by outdoor unit controls circuit 214. At higher frequencies, the compressor 208 provides the indoor VRF units 204 with greater heat transfer capacity. Electrical power consumption of compressor 208 increases proportionally with compressor frequency.

Heat exchanger 212 can function as a condenser (allowing the refrigerant to reject heat to the outside air) when VRF system 200 operates in a cooling mode or as an evaporator (allowing the refrigerant to absorb heat from the outside air) when VRF system 200 operates in a heating mode. Fan 210 provides airflow through heat exchanger 212. The speed of fan 210 can be adjusted (e.g., by outdoor unit controls circuit 214) to modulate the rate of heat transfer into or out of the refrigerant in heat exchanger 212.

Each indoor VRF unit 204 is shown to include a heat exchanger 216 and an expansion valve 218. Each of heat exchangers 216 can function as a condenser (allowing the refrigerant to reject heat to the air within the room or zone) when the indoor VRF unit 204 operates in a heating mode or as an evaporator (allowing the refrigerant to absorb heat from the air within the room or zone) when the indoor VRF unit 204 operates in a cooling mode. Fans 220 provide airflow through heat exchangers 216. The speeds of fans 220 can be adjusted (e.g., by indoor unit controls circuits 222) to modulate the rate of heat transfer into or out of the refrigerant in heat exchangers 216.

In FIG. 4, indoor VRF units 204 are shown operating in the cooling mode. In the cooling mode, the refrigerant is provided to indoor VRF units 204 via cooling line 224. The refrigerant is expanded by expansion valves 218 to a cold, low pressure state and flows through heat exchangers 216 (functioning as evaporators) to absorb heat from the room or zone within the building. The heated refrigerant then flows back to outdoor VRF unit 202 via return line 226 and is compressed by compressor 208 to a hot, high pressure state. The compressed refrigerant flows through heat exchanger 212 (functioning as a condenser) and rejects heat to the outside air. The cooled refrigerant can then be provided back to indoor VRF units 204 via cooling line 224. In the cooling mode, flow control valves 228 can be closed and expansion valve 230 can be completely open.

In the heating mode, the refrigerant is provided to indoor VRF units 204 in a hot state via heating line 232. The hot refrigerant flows through heat exchangers 216 (functioning as condensers) and rejects heat to the air within the room or zone of the building. The refrigerant then flows back to outdoor VRF unit via cooling line 224 (opposite the flow direction shown in FIG. 2). The refrigerant can be expanded by expansion valve 230 to a colder, lower pressure state. The expanded refrigerant flows through heat exchanger 212 (functioning as an evaporator) and absorbs heat from the outside air. The heated refrigerant can be compressed by compressor 208 and provided back to indoor VRF units 204 via heating line 232 in a hot, compressed state. In the heating mode, flow control valves 228 can be completely open to allow the refrigerant from compressor 208 to flow into heating line 232.

As shown in FIG. 4, each indoor VRF unit 204 includes an indoor unit controls circuit 222. Indoor unit controls circuit 222 controls the operation of components of the indoor VRF unit 204, including the fan 220 and the expansion valve 218, in response to a building zone temperature setpoint or other request to provide heating/cooling to the building zone, for example a temperature setpoint generated by the model predictive control circuit 402 of FIG. 5. For example, the indoor unit controls circuit 222 can generate a signal to turn the fan 220 on and off. Indoor unit controls circuit 222 also determines a heat transfer capacity required by the indoor VRF unit 204 and a frequency of compressor 208 that corresponds to that capacity. When the indoor unit controls circuit 222 determines that the indoor VRF unit 204 must provide heating or cooling of a certain capacity, the indoor unit controls circuit 222 then generates and transmits a compressor frequency request to the outdoor unit controls circuit 214 including the compressor frequency corresponding to the required capacity.

Outdoor unit controls circuit 214 receives compressor frequency requests from one or more indoor unit controls circuits 222 and aggregates the requests, for example by summing the compressor frequency requests into a compressor total frequency. In some embodiments, the compressor frequency has an upper limit, such that the compressor total frequency cannot exceed the upper limit. The outdoor unit controls circuit 214 supplies the compressor total frequency to the compressor, for example as an input frequency given to a DC inverter compressor motor of the compressor. The indoor unit controls circuits 222 and the outdoor unit controls circuit 214 thereby combine to modulate the compressor frequency to match heating/cooling demand. The outdoor unit controls circuit 214 may also generate signals to control valve positions of the flow control valves 228 and expansion valve 230, a compressor power setpoint, a refrigerant flow setpoint, a refrigerant pressure setpoint (e.g., a differential pressure setpoint for the pressure measured by pressure sensors 236), on/off commands, staging commands, or other signals that affect the operation of compressor 208, as well as control signals provided to fan 210 including a fan speed setpoint, a fan power setpoint, an airflow setpoint, on/off commands, or other signals that affect the operation of fan 210.

Indoor unit controls circuits 222 and outdoor unit controls circuit 214 may store and/or provide a data history of one or more control signals generated by or provided to the controls circuits 214, 222. For example, indoor unit controls circuits 222 may store and/or provide a log of generated compressor request frequencies, fan on/off times, and indoor VRF unit 204 on/off times. Outdoor unit controls circuit 214 may store and/or provide a log of compressor request frequencies and/or compressor total frequencies and compressor runtimes.

The VRF system 200 is shown as running on electrical power provided by an energy grid 250 via an outdoor meter 252 and an indoor meter 254. According to various embodiments, the energy grid 250 is any supply of electricity, for example an electrical grid maintained by a utility company and supplied with power by one or more power plants. The outdoor meter 252 measures the electrical power consumption over time of the outdoor VRF unit 202, for example in kilowatt-hours (kWh). The indoor meter 254 measures the electrical power consumption over time of the indoor VRF units 204, for example in kWh. The VRF system 200 incurs energy consumption costs based on the metered electrical power consumption of the outdoor meter 252 and/or the indoor meter 254, as billed by the utility company that provides the electrical power. The price of electrical power (e.g., dollars per kWh) may vary over time.

The VRF system 200 also includes a control system 150. The control system 150 generates control signals that control the operation of the VRF system 200 (e.g., by coordinating the indoor unit controls circuits 222 and the outdoor unit controls circuit 214). The control system 150 may use a model predictive control approach. The control system 150 may be configured to perform one or more optimizations to determine optimal control for the VRF system 200 over a optimization period, for example as described with reference to FIGS. 5 and 8-9 below. Furthermore, the control system 150 may be configured to perform online scheduling of prediction model updates as described with reference to FIGS. 8-9.

Building System with Model Predictive Controller

Referring now to FIG. 5, a building system 400 with a model predictive controller 402 is shown, according to an exemplary embodiment. The building system 400 includes the model predictive controller 402 communicably and operably coupled to an equipment controller 404. The equipment controller 404 is communicably and operably coupled to equipment 406, which is operable to affect a variable state or condition of a building 408, and to sensors 410 located in or near the building. The model predictive controller 402 is also communicably coupled to a weather service 412, a utility system 414, and a system identification circuit 416.

The model predictive control circuit 402 is configured to generate a temperature setpoint for the building for each time step in an optimization period to optimize a cost of operating the equipment. The model predictive control circuit 402 may be configured to use weather forecasts from the weather service 412 and utility rate data from the utility system 414 and a system model from the system identification circuit 416 to generate predicted loads and rates over a prediction horizon. The model predictive control circuit 402 may generate a cost function based on the predicted loads and rates and optimize the cost function to generates temperature setpoints for the optimization period. Various cost functions and model predictive control processes are possible, for example as described in U.S. patent application Ser. No. 16/115,290 filed Aug. 28, 2018, incorporated by reference in its entirety herein. Various configurations of the system identification circuit 416 are also possible in various embodiments, for example as described in detail in U.S. patent application Ser. No. 15/953,324, filed Apr. 13, 2018, incorporated by reference herein in its entirety.

The equipment controller 404 is configured to receive temperature setpoints from the model predictive control circuit 402 and, in response, control the equipment 406 to drive the temperature of the building (e.g., the indoor air temperature Tia) towards the temperature setpoint $T_{sp}$. The equipment controller 404 may include a proportional-integral-derivative (PID) controller or proportional-integral (PI) controller. The equipment controller 404 provides a control input to the building equipment 406 (e.g., operating frequency, power level, valve positions, etc.), which causes the building equipment 406 to operate to affect the temperature or other environmental conditional of the building 408. The sensors 410 measure the temperature (e.g., indoor air temperature $ET_{ia}$) or other environmental condition and provide that measured data to the equipment controller 404. The sensors 410 may also provide other relevant data, for example an outside air temperature $T_{oa}$. The equipment controller 404, the equipment 406, and the sensors 410 thereby form a control loop configured to drive the temperature in the building 408 towards the setpoint $T_{sp}$ provided by the model predictive control circuit 402 for a given time step.

Figure 8:
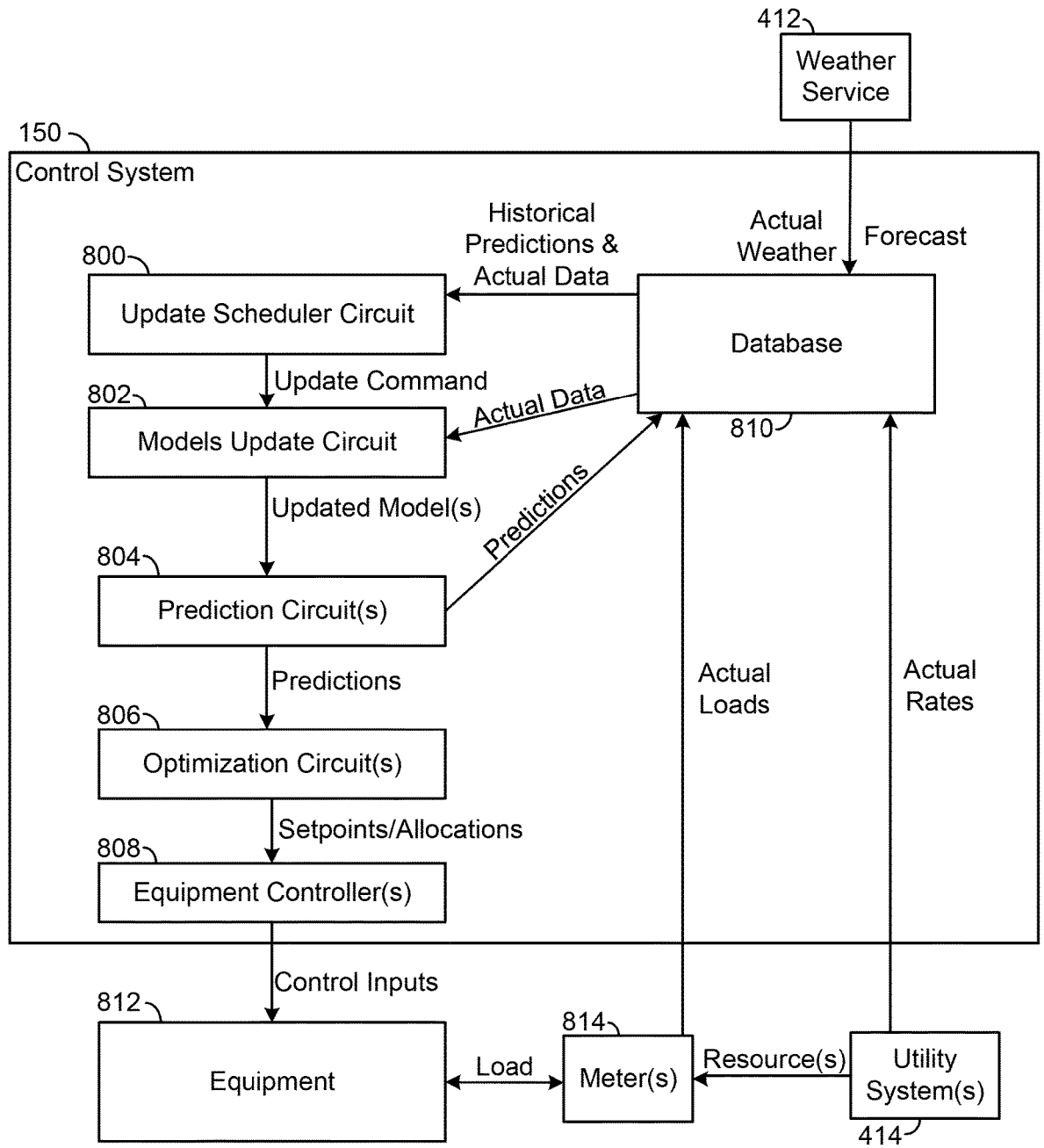
FIG. 8 is a block diagram of a prediction models system used with building equipment, according to an exemplary embodiment.
Figure 9:
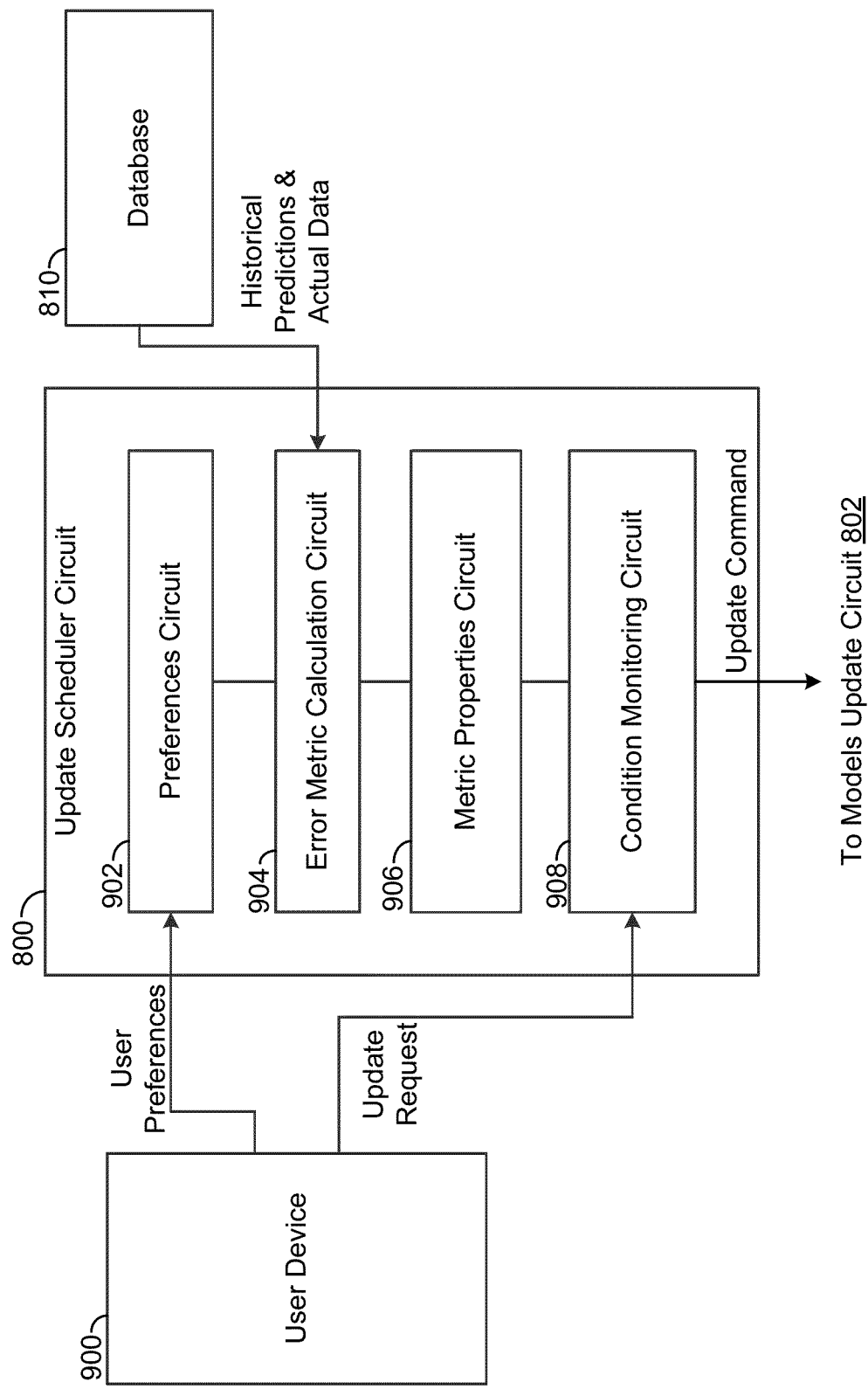
FIG. 9 is a block diagram of an update scheduler circuit of the prediction models system of FIG. 8, according to an exemplary embodiment.

The effectiveness of the model predictive controller in optimizing a cost of operating the equipment 406 is therefore dependent on the accuracy of the system model generated by the system identification circuit 416 and/or other models used by the model predictive controller 402 (e.g., a model used to predict future utility rates). The accuracy of these models may decay over time, resulting in sub-optimal performance of the building system 400. Accordingly, systems and methods for scheduling model updates may be included with the building system 400, for example as shown in FIGS. 8-9 and described in detail with reference thereto.

Central Plant with Energy Storage System

Referring now to FIG. 6, a block diagram of an energy storage system 500 is shown, according to an exemplary embodiment. Energy storage system 500 is shown to include a building 502. Building 502 may be the same or similar to building 10, building 201, or building 408, as described with reference to FIG. 1-5. For example, building 502 may be equipped with a HVAC system, VRF system, and/or a building management system that operates to control conditions within building 502. In some embodiments, building 502 includes multiple buildings (i.e., a campus) served by energy storage system 500. Building 502 may demand various resources including, for example, hot thermal energy (e.g., hot water), cold thermal energy (e.g., cold water), and/or electrical energy. The resources may be demanded by equipment or subsystems within building 502 or by external systems that provide services for building 502 (e.g., heating, cooling, air circulation, lighting, electricity, etc.). Energy storage system 500 operates to satisfy the resource demand associated with building 502.

Energy storage system 500 is shown to include a plurality of utilities 510. Utilities 510 may provide energy storage system 500 with resources such as electricity, water, natural gas, or any other resource that can be used by energy storage system 500 to satisfy the demand of building 502. For example, utilities 510 are shown to include an electric utility 511, a water utility 512, a natural gas utility 513, and utility M 514, where M is the total number of utilities 510. In some embodiments, utilities 510 are commodity suppliers from which resources and other types of commodities can be purchased. Resources purchased from utilities 510 can be used by generator subplants 520 to produce generated resources (e.g., hot water, cold water, electricity, steam, etc.), stored in storage subplants 530 for later use, or provided directly to building 502. For example, utilities 510 are shown providing electricity directly to building 502 and storage subplants 530.

Energy storage system 500 is shown to include a plurality of generator subplants 520. In some embodiments, generator subplants 520 are components of a central plant. Generator subplants 520 are shown to include a heater subplant 521, a chiller subplant 522, a heat recovery chiller subplant 523, a steam subplant 524, an electricity subplant 525, and subplant N, where N is the total number of generator subplants 520. Generator subplants 520 may be configured to convert one or more input resources into one or more output resources by operation of the equipment within generator subplants 520. For example, heater subplant 521 may be configured to generate hot thermal energy (e.g., hot water) by heating water using electricity or natural gas. Chiller subplant 522 may be configured to generate cold thermal energy (e.g., cold water) by chilling water using electricity. Heat recovery chiller subplant 523 may be configured to generate hot thermal energy and cold thermal energy by removing heat from one water supply and adding the heat to another water supply. Steam subplant 524 may be configured to generate steam by boiling water using electricity or natural gas. Electricity subplant 525 may be configured to generate electricity using mechanical generators (e.g., a steam turbine, a gas-powered generator, etc.) or other types of electricity-generating equipment (e.g., photovoltaic equipment, hydroelectric equipment, etc.).

The input resources used by generator subplants 520 may be provided by utilities 510, retrieved from storage subplants 530, and/or generated by other generator subplants 520. For example, steam subplant 524 may produce steam as an output resource. Electricity subplant 525 may include a steam turbine that uses the steam generated by steam subplant 524 as an input resource to generate electricity. The output resources produced by generator subplants 520 may be stored in storage subplants 530, provided to building 502, sold to energy purchasers 504, and/or used by other generator subplants 520. For example, the electricity generated by electricity subplant 525 may be stored in electrical energy storage 533, used by chiller subplant 522 to generate cold thermal energy, provided to building 502, and/or sold to energy purchasers 504.

Energy storage system 500 is shown to include storage subplants 530. In some embodiments, storage subplants 530 are components of a central plant. Storage subplants 530 may be configured to store energy and other types of resources for later use. Each of storage subplants 530 may be configured to store a different type of resource. For example, storage subplants 530 are shown to include hot thermal energy storage 531 (e.g., one or more hot water storage tanks), cold thermal energy storage 532 (e.g., one or more cold thermal energy storage tanks), electrical energy storage 533 (e.g., one or more batteries), and resource type P storage 534, where P is the total number of storage subplants 530. The resources stored in subplants 530 may be purchased directly from utilities 510 or generated by generator subplants 520.

In some embodiments, storage subplants 530 are used by energy storage system 500 to take advantage of price-based demand response (PBDR) programs. PBDR programs encourage consumers to reduce consumption when generation, transmission, and distribution costs are high. PBDR programs are typically implemented (e.g., by utilities 510) in the form of energy prices that vary as a function of time. For example, utilities 510 may increase the price per unit of electricity during peak usage hours to encourage customers to reduce electricity consumption during peak times. Some utilities also charge consumers a separate demand charge based on the maximum rate of electricity consumption at any time during a predetermined demand charge period.

Advantageously, storing energy and other types of resources in subplants 530 allows for the resources to be purchased at times when the resources are relatively less expensive (e.g., during non-peak electricity hours) and stored for use at times when the resources are relatively more expensive (e.g., during peak electricity hours). Storing resources in subplants 530 also allows the resource demand of building 502 to be shifted in time. For example, resources can be purchased from utilities 510 at times when the demand for heating or cooling is low and immediately converted into hot or cold thermal energy by generator subplants 520. The thermal energy can be stored in storage subplants 530 and retrieved at times when the demand for heating or cooling is high. This allows energy storage system 500 to smooth the resource demand of building 502 and reduces the maximum required capacity of generator subplants 520. Smoothing the demand also allows energy storage system 500 to reduce the peak electricity consumption, which results in a lower demand charge.

In some embodiments, storage subplants 530 are used by energy storage system 500 to take advantage of incentive-based demand response (IBDR) programs. IBDR programs provide incentives to customers who have the capability to store energy, generate energy, or curtail energy usage upon request. Incentives are typically provided in the form of monetary revenue paid by utilities 510 or by an independent service operator (ISO). IBDR programs supplement traditional utility-owned generation, transmission, and distribution assets with additional options for modifying demand load curves. For example, stored energy can be sold to energy purchasers 504 (e.g., an energy grid) to supplement the energy generated by utilities 510. In some instances, incentives for participating in an IBDR program vary based on how quickly a system can respond to a request to change power output/consumption. Faster responses may be compensated at a higher level. Advantageously, electrical energy storage 533 allows system 500 to quickly respond to a request for electric power by rapidly discharging stored electrical energy to energy purchasers 504.

Still referring to FIG. 6, energy storage system 500 is shown to include control system 150. In the embodiment of FIG. 6, control system 150 may be configured to control the distribution, production, storage, and usage of resources in energy storage system 500. In some embodiments, control system 150 performs an optimization process to determine an optimal set of control decisions for each time step within an optimization period. FIG. 7 shows a possible embodiment of such a control system 150. The control decisions may include, for example, an optimal amount of each resource to purchase from utilities 510, an optimal amount of each resource to produce or convert using generator subplants 520, an optimal amount of each resource to store or remove from storage subplants 530, an optimal amount of each resource to sell to energy purchasers 504, and/or an optimal amount of each resource to provide to building 502. In some embodiments, the control decisions include an optimal amount of each input resource and output resource for each of generator subplants 520.

Control system 150 may be configured to maximize the economic value of operating energy storage system 500 over the duration of the optimization period. The economic value may be defined by a value function that expresses economic value as a function of the control decisions made by control system 150. The value function may account for the cost of resources purchased from utilities 510, revenue generated by selling resources to energy purchasers 504, and the cost of operating energy storage system 500. In some embodiments, the cost of operating energy storage system 500 includes a cost for losses in battery capacity as a result of the charging and discharging electrical energy storage 533. The cost of operating energy storage system 500 may also include a cost of excessive equipment start/stops during the optimization period.

Each of subplants 520-534 may include equipment that can be controlled by control system 150 to optimize the performance of energy storage system 500. Subplant equipment may include, for example, heating devices, chillers, heat recovery heat exchangers, cooling towers, energy storage devices, pumps, valves, and/or other devices of subplants 520-534. Individual devices of generator subplants 520 can be turned on or off to adjust the resource production of each generator subplant. In some embodiments, individual devices of generator subplants 520 can be operated at variable capacities (e.g., operating a chiller at 10% capacity or 60% capacity) according to an operating setpoint received from control system 150.

In some embodiments, one or more of subplants 520-534 includes a subplant level controller configured to control the equipment of the corresponding subplant. For example, control system 150 may determine an on/off configuration and global operating setpoints for the subplant equipment. In response to the on/off configuration and received global operating setpoints, the subplant controllers may turn individual devices of their respective equipment on or off, and implement specific operating setpoints (e.g., damper position, vane position, fan speed, pump speed, etc.) to reach or maintain the global operating setpoints.

In some embodiments, control system 150 maximizes the life cycle economic value of energy storage system 500 while participating in PBDR programs, IBDR programs, or simultaneously in both PBDR and IBDR programs. For the IBDR programs, control system 150 may use statistical estimates of past clearing prices, mileage ratios, and event probabilities to determine the revenue generation potential of selling stored energy to energy purchasers 504. For the PBDR programs, control system 150 may use predictions of ambient conditions, facility thermal loads, and thermodynamic models of installed equipment to estimate the resource consumption of subplants 520. Control system 150 may use predictions of the resource consumption to monetize the costs of running the equipment.

Control system 150 may automatically determine (e.g., without human intervention) a combination of PBDR and/or IBDR programs in which to participate over the optimization period in order to maximize economic value. For example, control system 150 may consider the revenue generation potential of IBDR programs, the cost reduction potential of PBDR programs, and the equipment maintenance/replacement costs that would result from participating in various combinations of the IBDR programs and PBDR programs. Control system 150 may weigh the benefits of participation against the costs of participation to determine an optimal combination of programs in which to participate. Advantageously, this allows control system 150 to determine an optimal set of control decisions that maximize the overall value of operating energy storage system 500.

In some instances, control system 150 may determine that it would be beneficial to participate in an IBDR program when the revenue generation potential is high and/or the costs of participating are low. For example, control system 150 may receive notice of a synchronous reserve event from an IBDR program which requires energy storage system 500 to shed a predetermined amount of power. Control system 150 may determine that it is optimal to participate in the IBDR program if cold thermal energy storage 532 has enough capacity to provide cooling for building 502 while the load on chiller subplant 522 is reduced in order to shed the predetermined amount of power.

In other instances, control system 150 may determine that it would not be beneficial to participate in an IBDR program when the resources required to participate are better allocated elsewhere. For example, if building 502 is close to setting a new peak demand that would greatly increase the PBDR costs, control system 150 may determine that only a small portion of the electrical energy stored in electrical energy storage 533 will be sold to energy purchasers 504 in order to participate in a frequency response market. Control system 150 may determine that the remainder of the electrical energy will be used to power chiller subplant 522 to prevent a new peak demand from being set.

The control system 150 may utilize a model predictive control approach to fulfill these and other functions, including a stochastic model predictive control approach as described in detail in U.S. patent application Ser. No. 15/963,891, filed Apr. 26, 2018, incorporated by reference herein in its entirety. Furthermore, the control system 150 may be configured to perform online scheduling of prediction model updates as described with reference to FIGS. 8-9.

Referring now to FIG. 7, a block diagram illustrating a portion of central plant system 100 in greater detail is shown, according to an exemplary embodiment. FIG. 7 illustrates a cascaded optimization process performed by the control system 150 to optimize the performance of central plant equipment 700 (e.g., generator subplants 520 and storage subplants 530). In the cascaded optimization process, a high level optimization circuit 730 performs a subplant level optimization that determines an optimal distribution of thermal energy loads across generator subplants 520 and storage subplants 530 (shown in FIG. 7 as central plant equipment 700) for each time step in a prediction window in order to minimize the cost of energy consumed by central plant equipment 700. Low level optimization circuit 732 performs an equipment level optimization that determines how to best run each subplant at the subplant load setpoint determined by high level optimization circuit 730. For example, low level optimization circuit 732 may determine on/off states and/or operating setpoints for various devices of central plant equipment 700 within the subplants 520, 530 in order to optimize the energy consumption of each subplant while meeting the thermal energy load setpoint for the subplant. The high level optimization circuit 730 and the low level optimization circuit 732 may be included in the control system 150.

One advantage of the cascaded optimization process performed by control circuit 150 is the optimal use of computational time. For example, the subplant level optimization performed by high level optimization circuit 730 may use a relatively long time horizon due to the operation of the thermal energy storage. However, the equipment level optimization performed by low level optimization circuit 732 may use a much shorter time horizon or no time horizon at all since the low level system dynamics are relatively fast (compared to the dynamics of the thermal energy storage) and the low level control of equipment may be handled by a building automation system 708. Such an optimal use of computational time makes it possible for the control system 150 to perform the central plant optimization in a short amount of time, allowing for real-time predictive control. For example, the short computational time enables the control system 150 to be implemented in a real-time planning tool with interactive feedback.

Another advantage of the cascaded optimization performed by the control system 150 is that the central plant optimization problem can be split into two cascaded subproblems. The cascaded configuration provides a layer of abstraction that allows high level optimization circuit 730 to distribute the thermal energy loads across subplants without requiring high level optimization circuit 730 to know or use any details regarding the particular equipment configuration within each subplant. The interconnections between equipment within each subplant may be hidden from high level optimization circuit 730 and handled by low level optimization circuit 732. For purposes of the subplant level optimization performed by high level optimization circuit 730, each subplant may be completely defined by one or more subplant curves.

Still referring to FIG. 7, low level optimization circuit 732 may generate and provide subplant curves to high level optimization circuit 730. Subplant curves may indicate the rate of utility use by each of subplants (e.g., electricity use measured in kW, water use measured in L/s, etc.) as a function of the subplant load. In some embodiments, low level optimization circuit 732 generates subplant curves based on equipment models (e.g., by combining equipment models for individual devices into an aggregate curve for the subplant). Low level optimization circuit 732 may generate subplant curves by running a low level optimization process for several different loads and weather conditions to generate multiple data points. Low level optimization circuit 732 may fit a curve to the data points to generate subplant curves. In other embodiments, low level optimization circuit 732 provides the data points to high level optimization circuit 732 and high level optimization circuit 732 generates the subplant curves using the data points.

High level optimization circuit 730 may receive load and rate predictions from a load/rate prediction circuit 722. The load/rate predictions circuit 722 may generate load predictions based on weather forecasts from weather service 412 and/or information from building automation system 708 (e.g., a current electric load of the building, measurements from the building, a history of previous loads, a setpoint trajectory, etc.). The utility rate predictions may be based on utility rates received from utility systems 414 and/or utility prices from another data source. The load/rate predictions circuit 722 may use a predictive model to generate the load/rate predictions. The predictive model may be identified using historical data (e.g., historical predictions, historical loads, historical weather, historical rates).

High level optimization circuit 730 may determine the optimal load distribution for the subplants (e.g., a subplant load for each subplant) for each time step the prediction window and provide the subplant loads as setpoints to low level optimization circuit 732. In some embodiments, high level optimization circuit 730 determines the subplant loads by minimizing the total operating cost of central plant equipment 700 over the prediction window. In other words, given a predicted load and utility rate information from load/rate prediction circuit 722, high level optimization circuit 730 may distribute the predicted load across subplants 521-526 over the optimization period to minimize operating cost.

In some instances, the optimal load distribution may include using storage subplants 530 to store resources during a first time step for use during a later time step. For example, thermal storage may advantageously allow thermal energy to be produced and stored during a first time period when energy prices are relatively low and subsequently retrieved and used during a second time period when energy proves are relatively high. The high level optimization may be described by the following equation:

$$\theta_{HL}^* = \operatorname*{argmin}_{\theta_{HL}} J_{HL}(\theta_{HL})$$

where $\theta^*_{HL}$ contains the optimal high level decisions (e.g., the optimal load for each of subplants 12-22) for the entire optimization period and $J_{HL}$ is the high level cost function.

To find the optimal high level decisions $\theta^*_{HL}$, high level optimization circuit 732 may minimize the high level cost function $J_{HL}$. The high level cost function $J_{HL}$ may be the sum of the economic costs of each utility consumed by each of subplants 520-534 for the duration of the optimization period. In some embodiments, the high level cost function $J_{HL}$ may be described using the following equation:

$$J_{HL}(\theta_{HL}) = \sum_{k=1}^{n_h} \sum_{i=1}^{n_s} \left[ \sum_{j=1}^{n_u} t_s \cdot c_{jk} u_{jik}(\theta_{HL}) \right]$$

where $n_h$ is the number of time steps k in the optimization period, $n_s$ is the number of subplants, $t_s$ is the duration of a time step, $c_{jk}$ is the economic cost of utility j at a time step k of the optimization period, and $u_{jik}$ is the rate of use of utility j by subplant i at time step k.

In some embodiments, the cost function $J_{HL}$ includes an additional demand charge term such as:

$$w_d c_{demand} \max_{n_h}(u_{elec}(\theta_{HL}), u_{max,ele})$$

where $w_d$ is a weighting term, $c_{demand}$ is the demand cost, and the max( ) term selects the peak electricity use during the applicable demand charge period. Accordingly, the high level cost function $J_{HL}$ may be described by the equation:

$$J_{HL}(\theta_{HL}) = \sum_{k=1}^{n_h} \sum_{i=1}^{n_s} \left[ \sum_{j=1}^{n_u} t_s \cdot c_{jk} u_{jik}(\theta_{HL}) \right] + w_d c_{demand} \max_{n_h}(u_{elec}(\theta_{HL}), u_{max,ele})$$

The decision vector $\theta_{HL}$ may be subject to several constraints. For example, the constraints may require that the subplants not operate at more than their total capacity, that the thermal storage not charge or discharge too quickly or under/over flow for the tank, and that the thermal energy loads for the building or campus are met. These restrictions lead to both equality and inequality constraints on the high level optimization problem.

Still referring to FIG. 7, low level optimization circuit 732 may use the subplant loads determined by high level optimization circuit 730 to determine optimal low level decisions $\theta^*_{LL}$ (e.g. binary on/off decisions, flow setpoints, temperature setpoints, etc.) for equipment 700. The low level optimization process may be performed for each of subplants 521-526 and 531-534. Low level optimization circuit 732 may be responsible for determining which devices of each subplant to use and/or the operating setpoints for such devices that will achieve the subplant load setpoint while minimizing energy consumption. The low level optimization may be described using the following equation:

$$\theta_{LL}^* = \operatorname*{argmin}_{\theta_{LL}} J_{LL}(\theta_{LL})$$

where $\theta^*_{LL}$ contains the optimal low level decisions and $J_{LL}$ is the low level cost function.

To find the optimal low level decisions $\theta^*_{LL}$, low level optimization circuit 732 may minimize the low level cost function $J_{LL}$. The low level cost function $J_{LL}$ may represent the total energy consumption for all of equipment 700 in the applicable subplant. The low level cost function $J_{LL}$ may be described using the following equation:

$$J_{LL}(\theta_{LL}) = \sum_{j=1}^{N} t_s \cdot b_j \cdot u_j(\theta_{LL})$$

where N is the number of devices of equipment in the subplant, $t_s$ is the duration of a time step, $b_j$ is a binary on/off decision (e.g., 0=off, 1=on), and $u_j$ is the energy used by device j as a function of the setpoint $\theta_{LL}$. Each device may have continuous variables which can be changed to determine the lowest possible energy consumption for the overall input conditions.

Low level optimization circuit 732 may minimize the low level cost function $J_{LL}$ subject to inequality constraints based on the capacities of equipment and equality constraints based on energy and mass balances. In some embodiments, the optimal low level decisions $\theta^*_{LL}$ are constrained by switching constraints defining a short horizon for maintaining a device in an on or off state after a binary on/off switch. The switching constraints may prevent devices from being rapidly cycled on and off. In some embodiments, low level optimization circuit 732 performs the equipment level optimization without considering system dynamics. The optimization process may be slow enough to safely assume that the equipment control has reached its steady-state. Thus, low level optimization circuit 732 may determine the optimal low level decisions $\theta^*_{LL}$ at an instance of time rather than over a long horizon.

Low level optimization circuit 732 may determine optimum operating statuses (e.g., on or off) for a plurality of devices of equipment 700. According to an exemplary embodiment, the on/off combinations may be determined using binary optimization and quadratic compensation. Binary optimization may minimize a cost function representing the power consumption of devices in the applicable subplant. In some embodiments, non-exhaustive (i.e., not all potential combinations of devices are considered) binary optimization is used. Quadratic compensation may be used in considering devices whose power consumption is quadratic (and not linear). Low level optimization circuit 732 may also determine optimum operating setpoints for equipment using nonlinear optimization. Nonlinear optimization may identify operating setpoints that further minimize the low level cost function $J_{LL}$. Low level optimization circuit 732 may provide the on/off decisions and setpoints to building automation system 708 for use in controlling the central plant equipment 700.

In some embodiments, the low level optimization performed by low level optimization circuit 732 is the same or similar to the low level optimization process described in U.S. patent application Ser. No. 14/634,615, filed Feb. 27, 2015, incorporated by reference herein in its entirety.

In the optimization process illustrated by FIG. 7, the effectiveness of the high level optimization and low level optimization in achieving optimal or near-optimal costs is highly dependent on the accuracy of the load and rate predictions. The load and rate predictions may be generated using a predictive model generated based on historical data, including historical predictions, historical weather data, historical rates, and historical loads. Because of changes in weather, seasons, loads, behavior in the buildings, etc., the accuracy of the predictive model typically decreases over time. The predictive model must therefore be periodically be updated. In some approaches, the predictive model may be updated on an ad hoc basis (e.g., in response to user requests to update the model) or on a preset schedule (e.g., weekly). As described in detail below, the present disclosure relates to systems and methods for scheduling updates to the predictive model based on the performance of the model.

Systems and Methods for Prediction Model Update Scheduling

Referring now to FIG. 8, a block diagram of a control system 150 configured to automatically schedule model updates is shown, according to an exemplary embodiment. As shown in FIG. 8, the control system 150 includes an update scheduler circuit 800, a models update circuit 802, one or more prediction circuit(s) 804, one or more optimization circuit(s) 806, one or more equipment controller(s) 808, and a database 810, all communicably and operably coupled to one another. The control system 150 is communicably and operably coupled to equipment 812, one or more meters 814, and one or more utility systems 414. It should be understood that FIG. 8 shows one example embodiment and that various other configurations of circuitry configured to execute the functions described herein may be used in various embodiments.

The database 810 is configured to store both actual data relating to loads, rates, system behavior, weather, etc. (i.e., measured historical data) in addition to historical predictions (e.g., predictions of loads, rates, etc. made at a past point in time) and current predictions of loads, rates, etc. The database 810 thereby stores both the predicted and actual value of a load, rate, or other metric for each timestep up to the present time. As shown in FIG. 8, the database 810 receives predictions from the prediction circuit(s) 804, actual loads from the meter(s) 814, actual rates from the utility system(s) 414, and actual weather and weather forecasts from the weather service 412. The database 810 may be accessed by the update scheduler circuit 800, the models update circuit 802 and/or other circuits (e.g., the optimization circuit(s) 806) to allow use of the data stored therein to facilitate the functions described below.

The update scheduler circuit 800 is configured to receive historical predictions and actual data from the database 810, calculate an error metric based on the historical predictions and actual data, and determine when to update one or more prediction models based on properties of the error metric. The update schedule circuit 800 may provide an update command to the models update circuit 802 in response to determining that the one or more prediction models should be updated (e.g., in response to determining that a property of the error metric satisfies a predefined condition). The update scheduler circuit 800 is shown in detail in FIG. 9 and described further with reference thereto.

The models update circuit 802 is configured to receive the update command from the update scheduler circuit 800 and, in response, update one or more models. The models update circuit 802 may receive actual data (e.g., loads, rates, weather) from the database 810 and use the actual data in generating updated models. In various embodiments, the models update circuit 802 may follow various approaches to updating a model. For example, in some embodiments the models update circuit 802 corresponds to the system identification circuit 416 of FIG. 5, in which case the models update circuit 802 may use a prediction error method as described in U.S. patent application Ser. No. 15/953,324, filed Apr. 13, 2018, incorporated by reference herein in its entirety. In other embodiments, the models update circuit 802 updates a prediction model used for rate and load prediction by the load/rate prediction circuit 722, for example as described in U.S. patent application Ser. No. 14/717,593, filed May 20, 2015, incorporated by reference herein in its entirety.

The models update circuit 302 provides the updated model(s) to one or more prediction circuit(s) 804. In some embodiments, the prediction circuit 804 is the load/rate prediction circuit 722 of FIG. 7. In some embodiments, the prediction circuit 804 is included in the model predictive control circuit 402 of FIG. 5. The prediction circuit 804 generates predictions, i.e., future values of one or more points characterizing at least one of loads, rates, system behavior, etc. at each time step over a prediction horizon. As shown in FIG. 8, the prediction circuit 804 may provide the predictions to the database 810 and the one or more optimization circuit(s) 806.

The optimization circuit(s) 806 is configured to optimize a cost function over an optimization period using the predictions from the prediction circuit 804 to generate setpoints, asset allocations, subplant loads, or other optimization strategy for the equipment 812 over the optimization period. In some embodiments, the optimization circuit(s) 806 includes the high level optimization circuit 730 and/or the low level optimization circuit 732 of FIG. 7. In some embodiments, the optimization circuit 806 is included in the model predictive control circuit 402 of FIG. 5. Various optimizations are possible in various embodiments. The optimization circuit 806 provides the setpoints, asset allocations, etc. to equipment controllers 808. The equipment controllers 808 are configured to generate control signals for the equipment 812 to control the equipment 812 in accordance with the optimization strategy determined by the optimization circuit(s) 806. For example, the equipment controllers 808 may include the equipment controller 404 of FIG. 5 and/or the building automation system 708 of FIG. 7.

The equipment 812 is controllable by the equipment controller(s) 808 to consume or store one or more resources from the utility system(s) to affect one or more variable states or conditions of a building or campus. The equipment 812 may include equipment 406 of FIG. 5, central plant equipment 700 of FIG. 7, generator subplants 520 of FIG. 6, storage subplants 530 of FIG. 6, HVAC system 100 of FIG. 1, and/or VRF system 200 of FIGS. 2-4, among other possibilities. The one or more meter(s) 814 measure the amount of the resource(s) consumed by the equipment 812 and provide the measured load to the database 810. The utility system(s) 414 are configured to provide the actual rates for the consumed load to the database 810.

Referring now to FIG. 9, a detailed view of the update scheduler circuit 800 is shown, according to an exemplary embodiment. As shown in FIG. 9, the update scheduler circuit 800 is communicably and operably coupled to the database 810 and a user device 900. The user device 900 may include a personal computing device (e.g., desktop computer, laptop computer, tablet, smartphone, augmented/virtual reality headset). The user device 900 is configured to receive input from a user of various preferences relating to operation of the update scheduler circuit 800 as described in detail below. The user device 900 may also allow a user to input a request to update a prediction model on demand.

As shown in FIG. 9, the update scheduler circuit 800 includes a preferences circuit 902, an error metric calculation circuit 904, a metric properties circuit 906, and a condition monitoring circuit 908. The preferences circuit 902 is configured to store various preferences (settings) relating to the operation of the update scheduler 800. The preferences circuit 902 may receive user preferences from the user device 900 and updated the stored preferences accordingly. The preferences may include: a selection of the error metric to be calculated, a time horizon of the error metric, a weighting structure of the error metric, statistical properties of the error metric to be calculated, conditions/limits that trigger an update (e.g., upper control limit, lower control limit, control chart), etc. Various possible selections for such preferences are described in detail below. Accordingly, it should be understood that the update scheduler circuit 800 is highly customizable to match the needs of various building systems and to allow for online adjustments as desired by a user.

The error metric calculation circuit 904 is configured to receive historical predictions and actual data from the database 810 and calculate and error metric that characterizes the error between the historical predictions for a past time period and the actual data for that past time period. The error metric thereby characterizes the accuracy of the prediction model used to generate the historical predictions.

The particular error metric used by the error metric calculation circuit 904 is defined by the preferences circuit 902. In some embodiments, the error metric calculation circuit 904 calculates a coefficient of variation weighted mean absolute prediction error (CVWMAPE). The CVWMAPE is a metric calculated for every instant k at which a prediction over the horizon is performed as shown in (Eq. 1) below. The CVWMAPE is a scaled version of the weighted mean absolute prediction error (WMAPE) shown in (Eq. 2). In some embodiments, the error metric calculation circuit 904 calculates the WMAPE. The CVMAPE metric shows the exponentially weighted average of the absolute prediction error at each instant for which a prediction of the load or rate is generated:

$$CVWMAPE(k) = \frac{\sum_{i=k}^{k+h-1} w(i)|L_i - \hat{L}_i|}{\sum_{i=k}^{k+h-1} w(i)L_i} \quad \text{(Eq. 1)}$$

$$WMAPE(k) = \frac{\sum_{i=k}^{k+h-1} w(i)|L_i - \hat{L}_i|}{\sum_{i=k}^{k+h-1} w(i)} \quad \text{(Eq. 2)}$$

where $L_i$ is the actual value of the load or rate at instant i over the horizon, $\hat{L}_i$ is the predicted value of the load or rate at instant i over the horizon, h is the length of the horizon, and w(i) is a weighting function. The weighting function may be defined by the preferences circuit 902 and may be selectable by a user via the user device 900. For example, in some cases the weighting function may be defined or selected as $w(i)=e^{-i/h}$. The CVMAPE or WMAPE metric is calculated (updated) for every time step k for which a prediction is made.

In some embodiments, the error metric calculation circuit 904 calculates a smoothed (filtered) current prediction error. The smoothed current prediction error is another metric for evaluating the prediction of loads and rates. In the notation defined above, the smoothed current prediction error $e_i$ is a smoothing of a current prediction error $r_i = L_i - \hat{L}_i$ and is defined as $e_i = \lambda * e_{i-1} + (1-\lambda) * r_{i-1}$, where $0 < \lambda < 1$. The factor $\lambda$ may be referred to as the forgetting factor. Such a smoothing or filtering based on a forgetting factor may also be applied to the CVWMAPE or the WMAPE.

The error metric calculation circuit 904 thereby calculates an error metric over a preceding amount of time. The error metric thereby changes with time, such that a new value of the error metric may be calculated at each time step. The error metric calculation circuit 904 provides the error metric to the metric properties circuit 906.

The metric properties circuit 906 is configured to determine one or more statistical properties of the error metric. For example, the metric properties circuit 906 may determine a control region for the error metric by applying statistical analysis to the error metric over time. In some embodiments, the metric properties circuit 906 generates a statistically-defined upper limit and a statistically-defined lower limit on the value of the error metric. Such limits may be provided to the condition monitoring circuit 908. Because the error metric changes over time, the statistical properties (i.e., the values thereof) of the error metric also change over time. In some embodiments, the metric properties circuit 906 is configured to update the statistical property in response to an update to the prediction model by the models update circuit 802 (e.g., such that the updated statistical property is based on the updated prediction model). In such a case, the upper limit and/or lower limit may be updated based on the updated statistical property (i.e., based on the updated prediction model).

As one example, the metric properties circuit 906 calculate the statistical property based on a standard deviation.

For example, when the models are generated (e.g., as a regression model), there can be residuals from the fit. In such a case, the standard deviation of the residuals may be used to define the upper limit and/or lower limit. For example, the upper limit may be defined using $+2*\sigma$ and the lower limit may be defined using $-2*\sigma$. It should be understood that the present disclosure contemplates many such examples.

The condition monitoring circuit 908 is configured to monitor the error metric, determine when a trigger condition is met, and in response to determining that the trigger limit is met, generate a command to update the prediction model. The trigger condition may be defined based on a control region, where the trigger condition is met when the value of the error metric is outside of the control region (i.e., greater than an upper limit or less than a lower limit). In some embodiments, the trigger condition is met when the value of the error metric is outside of the control region for at least a threshold duration of time. The trigger condition may represent an error in the prediction model beyond an acceptable level.

The upper and lower limits and/or threshold duration may be defined statistically and calculated by the metric properties circuit 906 and/or may be defined as user preferences via the user device 900 and stored in the preferences circuit 902. In a case where the trigger condition (e.g., limit(s) of a control region) is defined as a statistical property of the error metric, the trigger condition may be updated to remain in accordance with changes in the statistical property of the error metric over time. Accordingly, the trigger condition may be automatically adjusted overtime to track behavior of the error metric.

When the condition monitoring circuit 908 determines that the trigger condition is met, indicating that the prediction model has deviated from an acceptable level of accuracy, the condition monitoring circuit 908 generates an update command and provides the update command to the models update circuit 802. The update command causes the models update circuit 802 to update the corresponding prediction model(s). The corresponding prediction model(s) may then be updated and used to generate control signals to control the equipment 812.

In some embodiments, updated scheduler circuit 800 is configured to generate a graphical user interface that includes an indication of the error metric and the trigger conditions. For example, the graphical interface may include a graph showing the error metric and the trigger condition for each time step in a displayed time period. The graphical user interface may be provided to the user device 900 and displayed on the user device 900. A user may thereby be able to view the error metric and the trigger condition and monitor the behavior of the update scheduler circuit 800 over time, for example to facilitate a user in changing various preferences or taking other actions relating to the operation of the updated scheduler circuit 800 or the equipment 812.

It should be understood that the calculation of the error metric, the determination of statistical properties relating to the error metric, and the trigger conditions are all highly configurable and customizable based on user preferences input via the user device 900. The update scheduler circuit 800 may have a flexible architecture that facilitates online adjustments to the calculations executed thereby. For example, the weighting in the calculation of the CVW-MAPE may be defined or selected by user input. As another example, a user may be allowed to selected between use of the CVWMAPE and the smoothed current prediction error for online operation of updated scheduler circuit 800. The value of the forgetting factor A may also be selected by a user. Various other adjustments may be made to tailor this approach to various building systems and various user preferences.

Configuration of Exemplary Embodiments

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, calculation steps, processing steps, comparison steps, and decision steps.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicably coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations. The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

What is claimed is:

1. A building system comprising:
building equipment operable to consume one or more resources and affect a variable state or condition of a building, the resources provided by one or more utility systems;
a control system configured to:
generate, based on a prediction model, predictions of at least one of a load on the building equipment or a price of the one or more resources for a plurality of time steps in an optimization period;
solve, based on the predictions, an optimization problem to generate control inputs for the equipment that minimize a predicted cost of consuming the one or more resources over the optimization period;
control the building equipment to operate in accordance with the control inputs;
monitor an error metric that characterizes an error between the predictions and actual values of the at least one of the load on the building equipment or the price of the one or more resources during the optimization period;
update a control region for the error metric in accordance with a change in a statistical property of the error metric;
detect an occurrence of a trigger condition by comparing the error metric to the control region; and
in response to detecting the occurrence of the trigger condition, update the prediction model to generate an updated prediction model;
generate updated control inputs for the building equipment based on the updated prediction model; and
control the building equipment to operate in accordance with the updated control inputs.

2. The building system of claim 1, wherein the control system is configured to calculate the error metric as a coefficient of variation weighted mean absolute prediction error of the predictions.

3. The building system of claim 2, wherein the control system is configured to calculate the coefficient of variation weighted mean absolute prediction error using a user-selectable weighting.

4. The building system of claim 1, wherein the control system is configured to calculate the error metric as a smoothed current prediction error.

5. The building system of claim 1, wherein the trigger condition occurs when the error metric is outside the control region.

6. The building system of claim 5, wherein the trigger condition occurs when the error metric is outside the control region for at least a threshold duration.

7. The building system of claim 5, wherein the control system is configured to determine at least one of an upper limit of the control region or a lower limit of the control region as a based on the statistical property of the error metric.

8. The building system of claim 7, wherein the control system is configured to update the statistical property of the error metric in response to updating the prediction model.

9. A method for controlling a building system, the method comprising:
operating building equipment to consume one or more resources and affect a variable state or condition of a building, the resources provided by one or more utility systems;
generating, based on a prediction model, predictions of at least one of a load on the building equipment or a price of the one or more resources for a plurality of time steps in a time period;
generating, based on the predictions, control inputs for the equipment that manage a predicted cost of consuming the one or more resources over the time period;
controlling the building equipment to operate in accordance with the control inputs;
monitoring an error metric that characterizes an error between the predictions and actual values of the at least one of the load on the building equipment or the price of the one or more resources during the time period;

updating a control region for the error metric in accordance with a change in a statistical property of the error metric;

detecting an occurrence of a trigger condition by comparing the error metric to the control region;

in response to detecting the occurrence of the trigger condition, updating the prediction model to generate an updated prediction model;

generating updated control inputs for the building equipment based on the updated prediction model; and controlling the building equipment to operate in accordance with the updated control inputs.

10. The method of claim 9, comprising calculating the error metric as a coefficient of variation weighted mean absolute prediction error of the predictions.

11. The method of claim 10, comprising calculating the coefficient of variation weighted mean absolute prediction error using a user-selectable weighting.

12. The method of claim 9, comprising calculating the error metric as a smoothed current prediction error.

13. The method of claim 9, wherein the trigger condition occurs when the error metric is outside the control region.

14. The method of claim 13, wherein the trigger condition occurs when the error metric is outside the control region for at least a threshold duration.

15. The method of claim 13, comprising determining at least one of an upper limit of the control region or a lower limit of the control region based on the statistical property of the error metric.

16. The method of claim 15, comprising the updating the statistical property of the error metric in response to updating the prediction model.

17. A central plant comprising:
a plurality of subplants operable to consume, generate, or store one or more resources, at least one of the resources provided by a utility system at a utility rate;
a control system configured to:
generate, based on one or more prediction models, predictions of at least one of a load on a campus served by the central plant or the utility rate for a plurality of time steps in an optimization period;
solve, based on the predictions, an optimization problem to generate control inputs for the subplants that minimize a predict cost of consuming the resource provided by the utility system over the optimization period;
control the subplants to operate in accordance with the control inputs;
monitor an error metric that characterizes an error between the predictions and actual values of the at least one of the load on the campus served by the central plant or the utility rate;
detect an occurrence of a trigger condition, the trigger condition dynamically updated in accordance with a time-varying statistical property of the error metric;
in response to detecting the trigger condition, update the one or more prediction models;
control the plurality of subplants in accordance with an optimization strategy generated based on the one or more prediction models.

18. The central plant of claim 17, wherein the control system is configured to calculate the error metric as a coefficient of variation weighted mean absolute prediction error of the predictions using a user-selectable weighting.

19. The central plant of claim 17, wherein the control system is configured to calculate the error metric as a smoothed current prediction error.

20. The central plant of claim 17, wherein the control system is configured to generate a graphical user interface comprising a visualization of the error metric and the trigger condition.

* * * * *